(12) United States Patent
Matthews et al.

(10) Patent No.: US 8,897,130 B2
(45) Date of Patent: Nov. 25, 2014

(54) NETWORK TRAFFIC MANAGEMENT

(75) Inventors: Brad Matthews, San Jose, CA (US);
Bruce Kwan, Sunnyvale, CA (US);
Mohan Kalkunte, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 804 days.

(21) Appl. No.: 12/765,624

(22) Filed: Apr. 22, 2010

(65) Prior Publication Data

US 2011/0063979 A1   Mar. 17, 2011

Related U.S. Application Data

(60) Provisional application No. 61/242,914, filed on Sep. 16, 2009.

(51) Int. Cl.
| | |
|---|---|
| H04L 12/26 | (2006.01) |
| H04L 12/741 | (2013.01) |
| H04L 29/06 | (2006.01) |
| H04L 12/725 | (2013.01) |

(52) U.S. Cl.
CPC .......... *H04L 45/302* (2013.01); *H04L 45/745* (2013.01); *H04L 69/14* (2013.01); *H04L 43/028* (2013.01)
USPC .......................................... 370/231; 370/401

(58) Field of Classification Search
None
See application file for complete search history.

(56) References Cited

U.S. PATENT DOCUMENTS

| | | | | |
|---|---|---|---|---|
| 5,477,542 A | * | 12/1995 | Takahara et al. | 370/468 |
| 5,809,011 A | * | 9/1998 | Almay | 370/218 |
| 6,798,747 B1 | * | 9/2004 | Watkins et al. | 370/238 |
| 7,212,490 B1 | * | 5/2007 | Kao et al. | 370/222 |
| 7,715,309 B2 | * | 5/2010 | Scholl et al. | 370/218 |
| 2005/0105469 A1 | * | 5/2005 | Hao | 370/229 |
| 2006/0092943 A1 | * | 5/2006 | Sundaram et al. | 370/394 |
| 2006/0187820 A1 | * | 8/2006 | French | 370/227 |
| 2006/0262784 A1 | * | 11/2006 | Cheethirala et al. | 370/389 |
| 2007/0053294 A1 | * | 3/2007 | Ho et al. | 370/235 |
| 2007/0064605 A1 | * | 3/2007 | Ho et al. | 370/230 |
| 2007/0274229 A1 | * | 11/2007 | Scholl et al. | 370/254 |
| 2007/0280245 A1 | | 12/2007 | Rosberg | |

* cited by examiner

*Primary Examiner* — Gregory Sefcheck
*Assistant Examiner* — Joshua Smith
(74) *Attorney, Agent, or Firm* — McDermott Will & Emery LLP

(57) ABSTRACT

Various example embodiments are disclosed. According to an example embodiment, an apparatus may include a switch fabric. The switch fabric may be configured to assign packets to either a first flow set or a second flow set based on fields included in the packets. The switch fabric may also be configured to send a first packet from the first flow set to a first flow set destination via a first path. The switch fabric may also be configured to determine, based at least in part on delays of the first path and a second path, whether sending a second packet from the first flow set to the first flow set destination via a second path will result in the second packet reaching the first flow set destination after the first packet reaches the first flow set destination, the second packet having been received by the router after the first packet. The switch fabric may also be configured to send the second packet to the first flow set destination via the second path based at least in part on the determining that sending the second packet from the first flow set to the first flow set destination via a second path will result in the second packet reaching the first flow set destination after the first packet reaches the first flow set destination.

19 Claims, 9 Drawing Sheets

NETWORK TRAFFIC MANAGEMENT

PRIORITY CLAIM

This application claims priority under 35 U.S.C. §119 to Provisional Patent Application 61/242,914, filed Sep. 16, 2009, titled "NETWORK TRAFFIC MANAGEMENT," which is incorporated herein by reference in its entirety.

TECHNICAL FIELD

This description relates to networking.

BACKGROUND

In computer networks, packets may be sent to their respective destinations via various paths. If multiple stations send packets along the same nodes or hops, congestion may occur at these nodes or hops. This congestion may slow down the transmission of the packets, and/or result in some of the packets being lost.

SUMMARY

The details of one or more implementations are set forth in the accompanying drawings and the description below. Other features will be apparent from the description and drawings, and from the claims.

DETAILED DESCRIPTION

Figure 1:
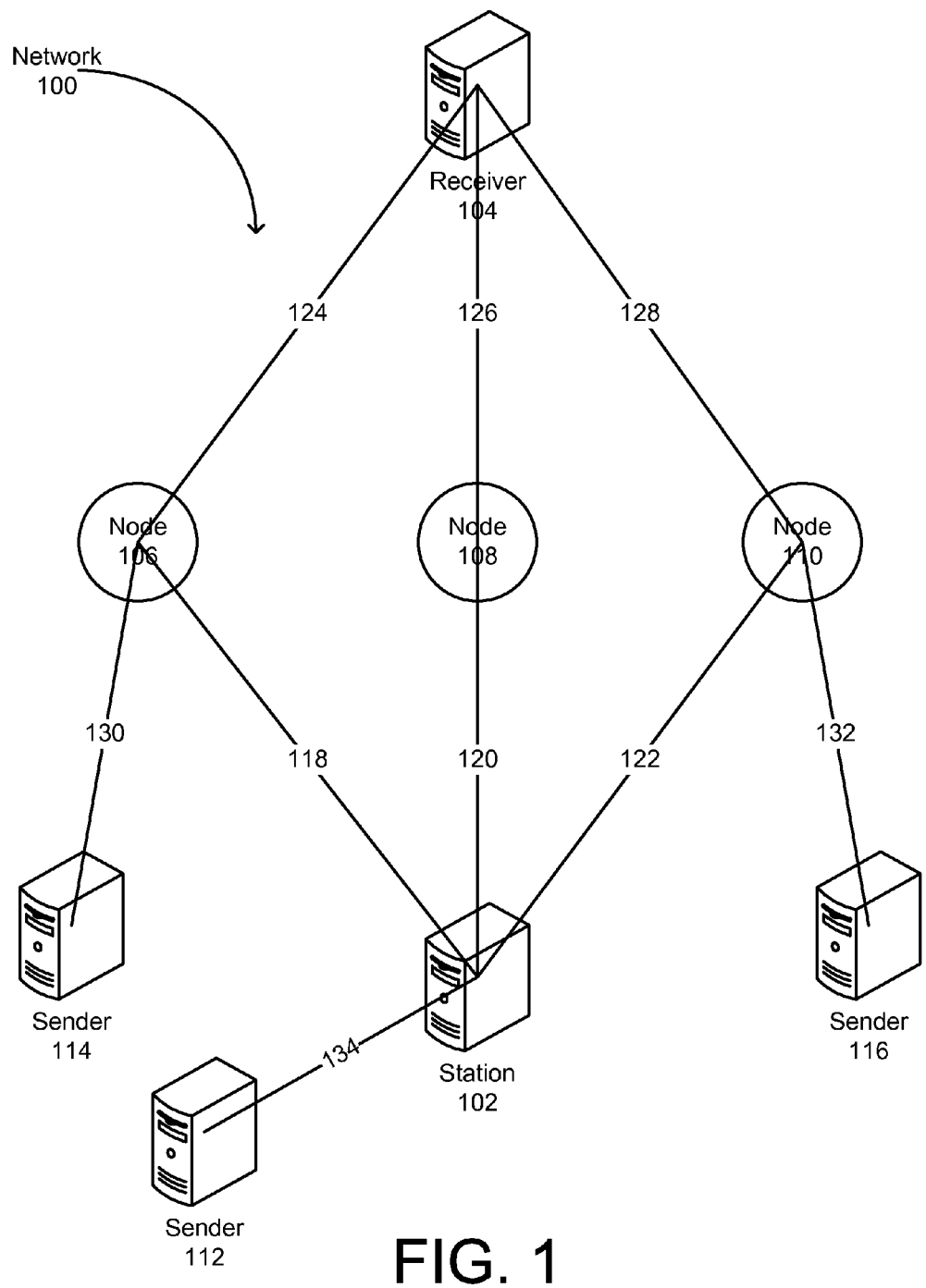
FIG. 1 is a diagram of a computer network according to an example embodiment.

FIG. 1 is a diagram of a computer network 100 according to an example embodiment. The network 100 may include, for example, a mesh network topology or a partial mesh network topology with multiple routes for messages to travel from source to destination. The network 100 may include a wired (guided) network, using twisted pairs, coaxial cables, or optical fibers, or wireless (unguided) network, or any combination of these, according to example embodiments. The network 100 may include a packet-switched network, in which stations break messages up into packets and send these packets, one at a time, into the network 100. The network 100 may utilize a virtual circuit approach to routing packets, in which a sending station plans a route for each packet before sending the packet into the network.

In an example embodiment, the packets originating from a given station may be hashed and bound to flow sets based on fields in and/or attributes of the respective packets. A component in the network 100, such as a router, switch, or switch fabric, may identify the flow set for each packet by hashing certain packet fields for the given packet. A flow set may be considered a set of state attributes (such as active, ingress port, path ID, move counter, and/or time stamp, discussed below) bound to a macroflow. Flows that hash to the same flow set may be considered to belong to a same macroflow, where a macroflow is a collection of smaller microflows.

Packets that hash to the same flow set, and/or macroflows belonging to a flow set, may be assigned to a same path through the network 100 by a network device such as a router, switch, or switch fabric, unless the path assignment maintained by the flow set is changed and/or the flow set is rerouted. A path assignment may include, for example, a series of next hops, such as in an equal cost multipath approach, a link aggregation group (LAG) member, or a trunk member (such as HiGig trunks), according to example embodiments. Rerouting flow sets will be discussed in further detail below.

The network 100 may include a station 102. The station 102 may include any type of computing device, such as a server, gateway, router, switch, relay node, personal computer, laptop or notebook computer, smartphone, personal digital assistant (PDA), or cellular telephone, according to example embodiments. The station 102 may have packets to send to a receiver 104 through the network 100. The receiver 104 may also include any type of computing device, such as a server, gateway, router, switch, relay node, personal computer, laptop or notebook computer, smartphone, personal digital assistant (PDA), or cellular telephone, according to example embodiments.

The station 102 may determine a path via which to send the packets to the receiver 104. A path may include a series of hops through specified nodes in the network 100. The paths to the receiver 104 may include any number of nodes 106, 108, 110 which store and forward the packets along the path to the receiver 104. The nodes 106, 108, 110 may also include any type of computing device, such as a server, gateway, router, switch, relay node, personal computer, laptop or notebook computer, smartphone, personal digital assistant (PDA), or cellular telephone, according to example embodiments. While three nodes 106, 108, 110 are shown FIG. 1, with only single-hop paths, any number of nodes 106, 108, 110 may be included in the network 100, and the network 100 may include any number of hops between the station 102 and the receiver 104.

The station 102 may utilize an equal cost multipath (ECMP) approach, in which multiple paths from a given source to a given destination having the same weight or cost are part of an ECMP group. The weight or cost may be based on a sum of weights or costs for each hop in the path. The weights or costs of each hop may be determined based, for example, on the speed of the link at the hop, the processing overhead at each hop, and/or the buffering capacity at each hop, according to example embodiments. The weights or costs of each hop may be assigned by a network administrator, according to an example embodiment. ECMP is merely an example of an aggregation group of paths from the source to the destination. Other examples of aggregation groups include link aggregation groups (LAGs) and HiGig trunks. The station 102 may distribute traffic across the paths in the aggregation group.

The station 102 may receive the packets from a source 112. The station 102 may include a plurality of ports, and may receive the packets from the source 112 via one or more of the ports. The source 112 may also include any type of computing device, such as a server, gateway, router, switch, relay node, personal computer, laptop or notebook computer, smartphone, personal digital assistant (PDA), or cellular telephone, according to example embodiments. The station 102 may determine the best path for packets received from the source 112. The source 112 may send packets to the station 102 as parts of flow sets.

The station 102 may contend with other senders 114, 116 for resources in the network 100. The senders 114, 116 may also include any type of computing device, such as a server, gateway, router, switch, relay node, personal computer, laptop or notebook computer, smartphone, personal digital assistant (PDA), or cellular telephone, according to example embodiments. The senders 114, 116 may send packets to the nodes 106, 108, 110. The station 102, receiver 104, nodes 106, 108, 110, source 112, and senders 114, 116 may communicate via links 118, 120, 122, 124, 126, 128, 130, 134, 134. The links 118, 120, 122, 124, 126, 128, 130, 134, 134 may include wired (guided) or wireless (unguided) media. The station 102, receiver 104, nodes 106, 108, 110, source 112, and senders 114, 116 may communicate via the links 118, 120, 122, 124, 126, 128, 130, 134, 134 according to various protocols, such as Ethernet (IEEE 802.3), Wireless Local Area Networks (802.11), Bluetooth (802.15), or Worldwide Interoperability for Microwave Access (802.16), as non-limiting examples.

Congestion may occur when a node 106, 108, 110 is receiving packets from both a sender 114, 116, and the station 102, for example. For example, if both the station 102 and the sender 114 are sending packets to the node 106, the node 106 may be unable to process and forward the packets at the same rates as the sum of the station 102 and the sender 114. The latency or delay of the paths via which the station 102 and/or sender 114 are sending packets to the receiver 104 may increase, resulting in slower packet delivery, and some packets may be dropped, as the packets exceed the node's 106 buffer capacity.

The station 102 may assign packets received from the source 112 to a flow set based on fields included in the packets. The station 102 may, for example, perform a hash operation on fields included in each of the packets to determine the assigned flow set for each packet. The station 102 may hash packets in a given flow set to produce a single hash value; the single hash value may be identical for all packets in a given flow. The station 102 may use the hash value to select a flow set. Examples of hashing functions which the station 102 may perform to obtain the hash value may include, for example, CRC16, CRC32, XOR operations, and/or Pearson's hash, according to example embodiments. Packets that hash to a given flow set may have the same source address and destination address. Packets in a flow set may also have consecutive sequence numbers; the receiver 104 may use the sequence numbers to put the message, which was broken down into packets, back into its original order, according to an example embodiment.

Figures 2, 3, 4:
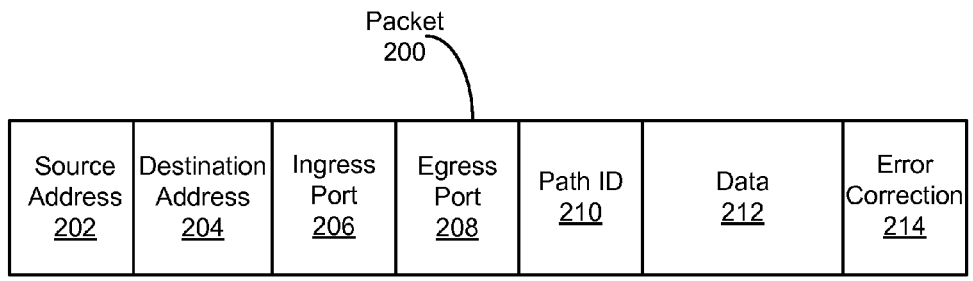
FIG. 2 is a block diagram of a packet according to an example embodiment.
FIG. 3 shows a flow table according to an example embodiment.
FIG. 4 shows a path table according to an example embodiment.

FIG. 2 is a block diagram of a packet 200 according to an example embodiment. While the term, "packet" is used herein, "packet" may also include frames or other formats which include data and other fields which may be used to determine a flow set.

In the example shown in FIG. 2, the packet 200 may include a source address field 202. The source address field 202 may indicate an address of a network device from which the packet 200 originated, such as the source 112, or another network device which generated the packet 200 before the source 112 received the packet 200. The source address field 202 may include, for example, an Internet Protocol (IP) and/or Ethernet address of the originating network device.

In the example shown in FIG. 2, the packet 200 may also include a destination address field 204. The destination address field 204 may indicate an address of a network device for which the packet 200 is destined or intended to be sent, such as the receiver 104, or another network device to which the packet 200 is intended to be sent. The destination address field 204 may include, for example, an IP and/or Ethernet address of the originating network device.

In the example shown in FIG. 2, the packet 200 may also include an ingress port field 206. The station 102 may include multiple ports to receive and/or send packets. The ingress port field 206 may indicate the port via which the station 102 received the packet. The station 102 may, for example, fill in or add the ingress port field 206 during receipt of the packet 200.

In the example shown in FIG. 2, the packet 200 may also include an egress port field 208. The egress port field 208 may indicate a port via which the station 102 will send the packet 200 into the network 100. The station 102 may fill in or add the egress port field 208 after determining which port the station 102 will send the packet 200 through. The port determination may be based in part on a determination of a path for the packet 200.

In the example shown in FIG. 2, the packet 200 may also include a path ID field 210. The path ID field 210 may indicate a path via which the packet 200 will travel to reach its destination, such as the receiver 104. The path may include an index number, which may compared to a table which indicates which nodes 106, 108, 110 or hops the packet 200 will travel through to reach its destination, or may include addresses for each node 106, 108, 110 or hop the packet 200 will travel through, as well as the address of the destination, which may be the receiver 104, according to example embodiments.

The path ID may have been determined, for example, by the station 102 performing a hashing function on fields in the packet 200, such as the source address field 202 and the destination address field 204. The station 102 may hash the fields in the packet 200 to identify a flow set for the packet 200. In an example embodiment, the station 102 may perform a modulo operation on the hash value to obtain the path ID. The value performed in the modulo operation may be based, for example, on the number of available paths for the packet 200 to reach its destination. For example, if there are three available paths, through nodes 106, 108, 110, from the station 102 to the receiver 104, then station 102 may perform a modulo 3 operation on the hash value to select one of the three paths. The station 102 may fill in or add the path ID field 210 after determining the path for the packet 200.

In the example shown in FIG. 2, the packet 200 may also include a data field 212. The data field 212 may include the data transmitted by the packet 200.

In the example shown in FIG. 2, the packet 200 may also include an error correction field 214. The error correction field 214 may include information which allows the station 102, receiver 104, and/or nodes 106, 108, 110 to detect and/or correct errors in the packet, such as a frame check sequence (FCS) or a cyclic redundancy code (CRC), according to example embodiments.

While the source address field 202, destination address field 204, ingress port field 206, egress port field 208, path ID field 210, data field 212, and error correction field 214 are shown in FIG. 2, less than all of these fields may be included in the packet 200, and/or other fields which are not shown in FIG. 2 may be included in the packet 200, according to various example embodiments.

Returning to FIG. 1, the station 102 may receive packets from the source 112. The received packets may be destined for the receiver 104. The station 102 may assign the received packets to a flow set, such as to a first flow set or a second flow set, based on fields included in the packets. The station 102 may, for example, perform a hashing function on selected packet fields to generate a hash key. The station 102 may use the hash key to determine the flow sets of the respective packets.

The station 102 may also assign a path, which may be denoted by a path ID, to each flow set. The station 102 may, for example, perform a modulo operation for each flow set. The station 102 may perform the modulo operation based on a number of possible paths, or a number of equal cost paths, for the packets in the respective flow sets to reach their respective destinations. The station 102 may send packets to their destinations via their assigned paths based on their assigned flow sets. The station 102 may send the packets via one or more of the ports included in the station 102. The station 102 may, for example, maintain a flow table with information for each of the flow sets.

FIG. 3 shows a flow table 300 according to an example embodiment. In this example, a row may be maintained for each flow set 302. In the example shown in FIG. 3, a column may not be maintained to store each flow set identifier because the flow sets are identified by an index to the flow table 300. While five flow sets (0 through 4) are shown in FIG. 3, the flow table 300 may include columns for any number of flow sets, according to example embodiments.

The flow set 302 may be identified by the result of the hash operation performed on fields, such as the source address 202 and the destination address 204, in the received packets. The flow table 300 may include an active entry 304 for each of the flow sets. The active entry 304 may indicate whether a flow set is valid for assignment to a new path. For example, if packets bound to the flow set are still in the network 100 and may not yet have reached their destination (e.g., the receiver 104), then the flow set may not be valid for assignment to a new path because sending packets to the destination via a new path could result in reordering the packets; packets sent to the destination via the new path could arrive at the destination before previously-sent packets sent via the old path. However, if all packets in the flow set are out of the network 100 because they have already reached their destination, then the flow set may be considered valid for assignment to a new path because no reordering of the packets could occur.

Or, a skew or time difference since receiving and/or sending a last packet bound to a flow set may be sufficient that reordering of the packets will not occur. For example, if a sufficiently long period of time has expired since a last packet bound to a flow set was sent via the old path, that packets bound to the flow set may be sent via the new path without reordering of the packets, the flow set may be considered valid for assignment to the new path. The time period which makes a flow set valid for assignment may be based, for example, on a latency or delay of the old path and/or a latency or delay of the new path, such as a difference between the latencies or delays of the old path and the new path, according to example embodiments.

The station 102 may determine whether packets in a flow set have reached their destination based on latency or delay of the path for the flow set and based on a time since a last packet was sent to the destination via the path. The station 102 may determine latency or delay of paths by sending probing packets to the destination via the paths. The probing packets may be packets used only to determine path latency or delay, or may be included in data packets sent to the destination, according to example embodiments. The probing packets may be time-stamped with sending and/or receipt times to determine the latency or delay of the path(s). The destination (e.g., receiver 104) may send the probing or response packets back to the station 102. The station 102 may determine the path latency or delay after receiving the probing or response packets based on their time stamps, according to an example embodiment. The station 102 may compare the path latency or delay to a time that a last packet in the flow set was sent; if the time difference between sending the last packet in the flow set and the present time exceeds the path latency, or delay then the station 102 may consider all the packets to be out of the network 100 and/or may consider the period of inactivity to be sufficient for the flow set to receive a new path assignment, and the flow set valid for assignment to a new path, according to an example embodiment.

The flow table 300 may also include an ingress port entry 306 for each of the flow sets. The ingress port entry 306 may store the port via which the packets in the flow set are received. The flow table 300 may also include a path ID entry 308 for each of the flow sets. The path ID entry 308 may indicate the current path for the flow set. The path ID may be determined based, for example, on a virtual local area network (VLAN) tag.

The flow table 300 may also include a move counter entry 310 for each flow set. The move counter may indicate a number of times that packets bound to the flow set have received a new path assignment. A high move count may indicate that a flow set is changing paths frequently. Frequent modification of the path assignment for a given flow set may cause thrashing, an undesirable effect in which new calculations and storage of path settings reduces efficiency in the station 102 and the network 100. The station 102 may initialize the move counter to zero, and may reduce the move count periodically so that the move counter entry 310 indicates the number of path changes per unit of time. In an example embodiment, the station 102 may compare the move counter to a threshold, and may determine that a flow set should not be rerouted due to an excessive move count.

In example embodiments, the station 102 may store the move count for a flow set, an aggregation group (such as an ECMP group), or members of the aggregation group (such as a single path). The station 102 may limit the moves for a flow set, an aggregation group, and/or members of the aggregation group over a predetermined period or unit of time, and may prevent the rerouting of a flow set based on the move count exceeding a predetermined threshold. The station 102 may refresh the move count, such as to zero, upon expiration of a timer, or may decrement the move count upon expiration of a counter, according to example embodiments.

The flow table 300 may also include a time stamp entry 312. The station 102 may store a time at which a most recent packet was sent for each flow set in the time stamp entry 312. The station 102 may use the time stamp stored in the time stamp entry 312 to determine whether a latency or delay is sufficient to assign the flow set to a new path, according to an example embodiment.

The station 102 may also maintain a path table with information regarding each of the paths.

FIG. 4 shows a path table 400 according to an example embodiment. In this example, a row may be maintained for each path ID 402. In the example shown in FIG. 4, a column may not be maintained to store each path ID 402 because the path IDs 402 are identified by an index to the path table 400. While five path IDs (0 through 4) are shown in FIG. 4, the path table 400 may include columns for any number of flow sets, according to example embodiments.

The path table 400 may include an active entry 404. The active entry 404 may indicate whether a given path should be considered for probing and path alterations or rerouting. The active entry 404 may, for example, indicate whether the path ID entry 308 for any of the flow sets 302 in the flow table 300 indicates that particular path ID in the path table 400. The path may be considered active, and identified as active in its active entry 404, if it is identified in a path id entry 308 of a flow set 302 which is identified as active in the active entry 304. The station 102 may send probing packets down a path based on its active entry 404 indicating that the path is active, according to an example embodiment.

The path table 400 may also include an instantaneous latency entry 406 for each path ID 402. The instantaneous latency entry 406 may indicate a measured latency for a most recent probing packet. The path table 400 may also include an average latency entry 408 for each path ID 402. The average latency entry 408 may indicate an average of a last k latency measurements based on the k most recent probing packets.

The path table 400 may also include a path state entry 410 for each path ID 402. The path state entry 410 may indicate a degree of path congestion for the given path based on the instantaneous latency and/or the average latency. The station 102 may, for example, compare each of the instantaneous latency and the average latency to a latency threshold. In an example embodiment, if neither the instantaneous latency nor the average latency exceed the latency threshold, then the path may be considered not to be experiencing congestion. If the instantaneous latency exceeds the latency threshold but the average latency does not exceed the latency threshold, then the path may be considered to be experiencing transient congestion. If the instantaneous latency does not exceed the latency threshold but the average latency does exceed the threshold, then the path may be considered to be experiencing bursty congestion. If both the instantaneous latency and the average latency exceed the latency threshold, then the path may be considered to be experiencing severe and/or persistent congestion. The station 102 may consider the type of congestion experienced by a path when determining whether to switch a flow set to the path, according to an example embodiment.

In another example embodiment, the station 102 may concatenate the instantaneous latency and the average latency. The station 102 may, for example, map each of the instantaneous latency and the average latency to a two-dimensional table (such as a latency table). The table may provide the station 102 with a latency metric based on the instantaneous latency and the average latency. The station 102 may store each of the instantaneous latency, average latency, and/or latency metric as a predetermined number of bits, such as one, two, three, or four bits, according to example embodiments. The station 102 may, for example, consider the latency metric of a path in determining whether to switch a flow set to or from the path.

Figure 5A:
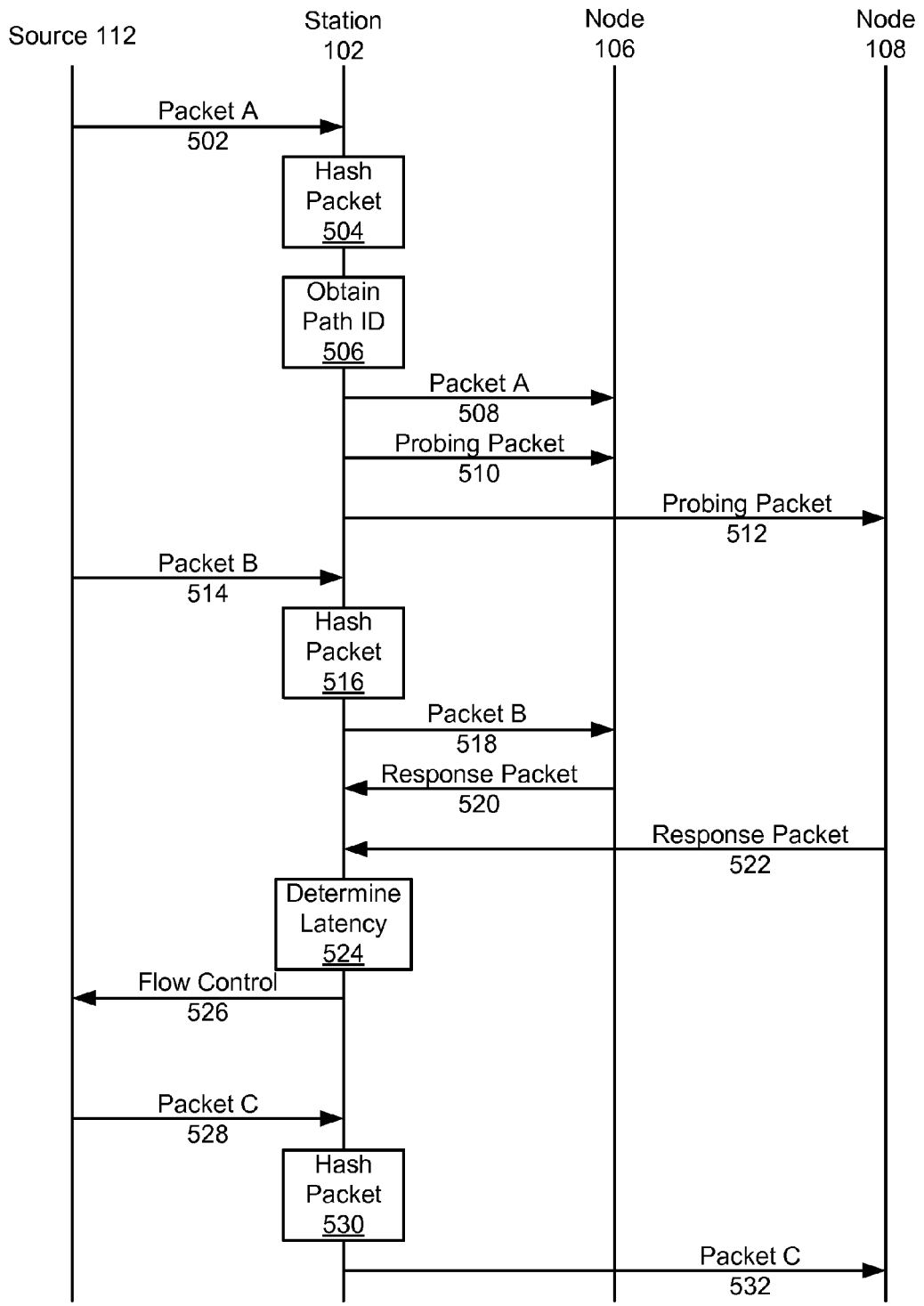
FIG. 5A is a timing diagram showing a station send packets in a flow set via a first path and then reroute the flow set and send a packet via a second path according to an example embodiment.

FIG. 5A is a timing diagram showing the station 102 send packets in a flow set via a first path and then reroute the flow set and send a packet via a second path according to an example embodiment. In this example, the station 102 may receive a packet, such as a first packet or packet A 502, from the source 112. The source 112 may have generated the packet A 502, or the source 112 may have received the packet A 502 from another station or node.

Upon receipt of the packet A, the station 102 may hash the packet A 502 (504). The station 102 may, for example, hash fields in the packet A 502, such as the source address 202 and the destination address 204. Based on hashing the packet A 502, the station 102 may assign the packet A 502 to a flow set. The flow set to which the packet A 502 is assigned may be distinct from flow sets of other packets received by the station 102, which are not shown in FIG. 5A.

The station 102 may also obtain a path ID (506) for the packet A 502 based on the packet A's 502 flow set. The station 102 may, for example, check the flow table 300 to determine whether a path ID 308 has already been assigned to the flow set 302 of the packet A 502. If a path ID 308 has already been assigned to the flow set 302 of the packet A 502, then this path ID 308 may be used, and the station 102 may update the active entry 304 for the flow set 302 as active. If a path ID 308 has not been assigned to the flow set 302, then the station 102 may determine a path for the flow set 302 of the packet A 502. The station 102 may, for example, perform a hashing operation (such as a modulo operation) on the flow set of the packet A 502; the hashing operation may use a number based on a number of possible paths for any packets leaving the station 102. The station 502 may also determine an ingress port for the flow set 302 of the packet A 502. The station 502 may update the flow table 300, such as by storing the path ID 308 and/or the ingress port 306; the station 502 may also mark the active entry 304 as active, according to an example embodiment.

The station 102 may also check whether the path ID 402 is marked as active in the path table 400. If the active entry 404 for the path ID 402 does not indicate that the path is active, then the station 102 may update the path table 400, such as by updating the active entry 404 for the path ID 402 to indicate that the path is active, according to an example embodiment.

After hashing the packet (504) to obtain the flow set and/or obtaining the path ID (506), the station 102 may modify the packet A 508. The station 102 may modify the packet A by, for example, updating, modifying, or inserting the egress port field 208 and/or the path ID field 210. The station 102 may then send the packet A 508 to the receiver 104 (not shown in FIG. 5A) via the assigned or selected path. In this example, the assigned path includes node 106; thus, the station 102 sends the packet 508 to node 106.

The station 102 may also send probing packets 510, 512 along various possible paths. While FIG. 5A shows the station 102 sending two probing packets 510, 512 to the nodes 106, 108, any number of probing packets 510, 512 may be sent to probe any possible number of paths. In examples of multihop networks, multiple probing packets 508, 510 may be sent to each node 106, 108 to accommodate diverging paths downstream. While FIG. 5A shows the station 102 sending the probing packets 510, 512 after sending the packet A 508, the station 102 may send the probing packets 510, 512 at any time, and may repeatedly send probing packets 510, 512 at periodic or random intervals, according to various example embodiments.

After sending the first packet or packet A 508 to the first path via the node 106, the station 102 may receive another packet, such as a second packet or packet B 514, from the source 112. Upon receipt of the packet B 514, the station 102 may hash the packet B 514 (516) to obtain the flow set of the packet B 514. The station 102 may, for example, hash the source address 202 and the destination address of the packet B 514 to obtain the flow set for the packet B 514. If the station 102 determines that the packet B 514 is part of an existing flow set, such as the same flow set as the packet A 502/508, then the station 102 may update the flow table 300, such as by marking the flow set as active, and/or update or modify the packet B 518, such as by inserting or modifying the egress port field 208 and/or path ID field 210. The station 102 may also send the packet B to the receiver 104 via the identified path, such as to the node 106 to which the packet A 508 was sent.

The station 102 may receive response packets 520, 522. The response packets 520, 522 may have been sent to the station 102 by the receiver 104 in response to the probing packets 510, 512. The response packets 520, 522 may each correspond to the path via which their associated probing packets 510, 512 were sent. The station 102 may receive the response packets 520, 522 from the nodes 106 108 which are part of the paths for which the response packets 520, 522 indicate latency periods.

The response packets 520, 522 may include timestamps. The timestamps may indicate the time that the station 102 sent the probing packets 510, 512 associated with the respective response packets 520, 522, a time at which the receiver 104 received the associated probing packets 510, 512, and/or times at which nodes 106, 108 in the respective paths received the probing packets 510, 512 and/or response packets 520, 522. While FIG. 5A shows the station 102 receiving the response packets 520, 522 after sending the packet B 518, the station 102 may receive response packets at any time from any number of nodes 106, 108 via any number of paths, according to various example embodiments.

The station 102 may determine the latency of the paths (524). The station 102 may, for example, update the path table 400 based on the timestamps included in the response packets 520, 522. The station 102 may, for example, update the instantaneous latency entry 406 and/or the average latency entry 408 for the path ID with which the response packets 520, 522 are associated. The station 102 may also update the path state entries 410 for the path IDs based on the instantaneous latency and/or average latency, as described above with respect to FIG. 4.

If the station 102 determines that a path for a flow set exceeds a threshold, and/or determines that the path for the flow set is congested, the station 102 may reroute the path. The station 102 may, for example, change the path ID entry 308 for the flow set 302 in the flow table. The changed path ID entry 308 may result in the station 102 sending subsequent packets for the flow set to the receiver 104 via a new path. The station 102 may, for example, select a path for the flow set with a lower latency than the previous path.

In an example embodiment, the station 102 may send a flow control message 526 to the source 112. The flow control message 526 may include a priority flow control (PFC) message indicating priority bits, may include a pause message indicating a pause time for which the source 112 should stop sending packets to the station 102, and/or may include an out-of-band signaling message, according to example embodiments. In the example of the pause message, the pause time may be a time for which the source 112 should stop sending any packet to the station 102, for which the source 112 should stop sending packets which have a specified destination address to the station 102, or for which the source 112 should stop sending packets which are part of a given flow set, according to various example embodiments. The pause time may be based on a difference in latencies between the old path and the new path to which the flow set is rerouted, and/or may be based on a path skew of the old path and/or new path. The pause time may also include an additional value to account for random changes in the latencies of the paths. The pause time may also be reduced by a time since the last packet in the flow set was sent. The pause time may ensure that packets sent to the receiver 104 via the new path do not reach the receiver 104 before all of the packets sent to the receiver 104 via the old path reach the receiver 104. This may prevent the packets from becoming reordered when the path is changed for a flow set.

After the pause time has expired, the source 112 may send a new packet, such as a third packet or packet C 528, which is part of the same flow set, to the station 102. The station 102 may hash the packet C 528 and determine that the packet C 528 is part of the same flow set as the packet A 502 and the packet B 514. Upon determining the flow set for the packet C 528, the station 102 may modify the packet C 528, such as by inserting or updating the egress port field 208 and/or path ID field 210, based on the updated path ID entry 308 for the flow set 302 in the flow table 300. The station 102 may also update the flow table 300 to indicate that the flow set 302 is active, such as by updating the active entry 304. The station 102 may send the updated packet C 532 to the receiver 104 via the new path, such as via the node 108, according to an example embodiment.

Figure 5B:
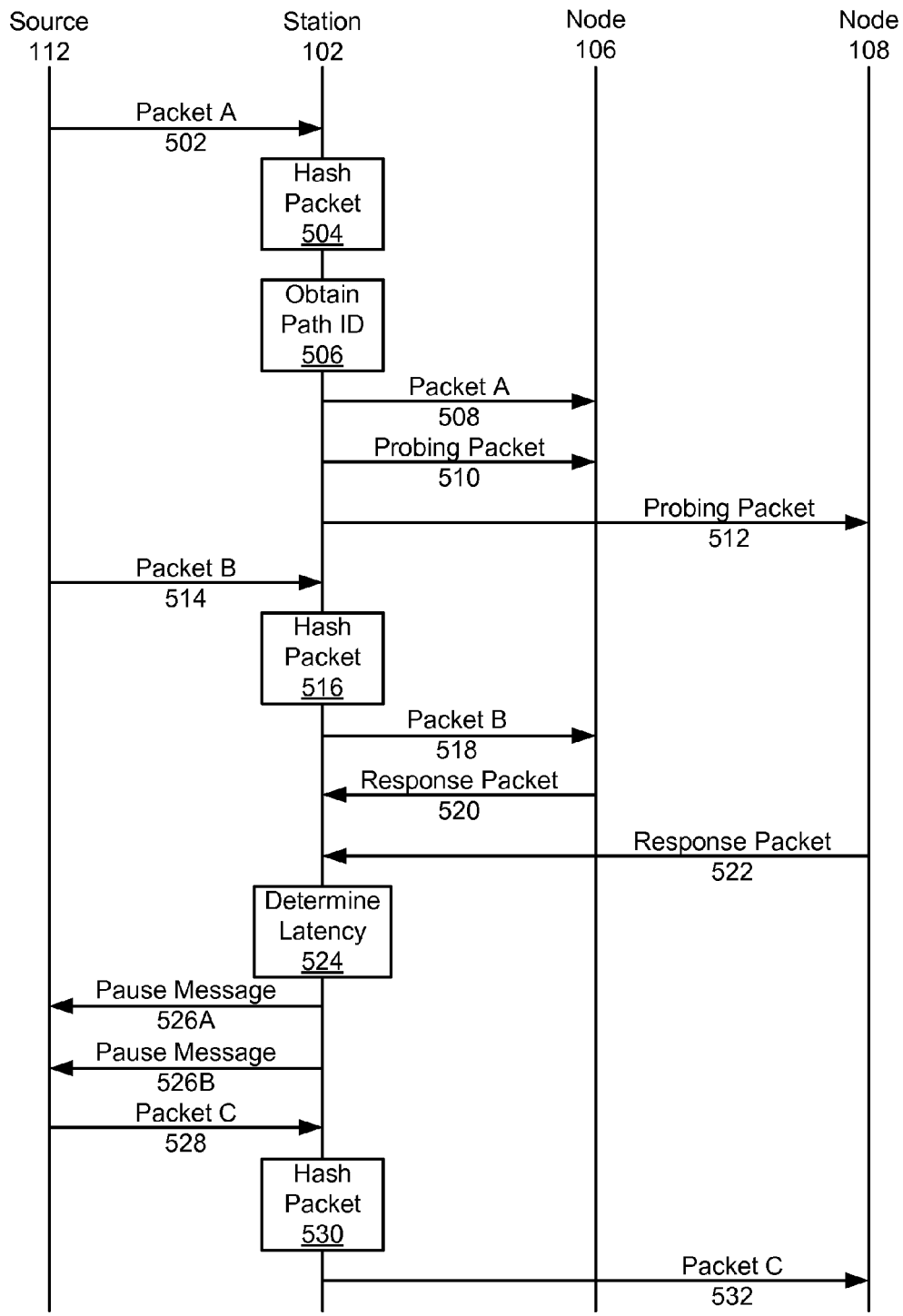
FIG. 5B is a timing diagram showing the station send packets in the flow set via the first path and then reroute the flow set and send a packet via the second path according to another example embodiment.

FIG. 5B is a timing diagram showing the station 102 send packets A 508, B 518 in the flow set via the first path and then reroute the flow set and send the packet C 532 via the second path according to another example embodiment. In this example, the station 102, receiver 104, nodes 106, 108, and source 112 may perform similar functions to those described above with reference to FIG. 5A. However, in this example, the pause message 526 may not indicate the pause time. Instead, in this example, the station 102 may send multiple pause messages 526A, 526B to the source 112. Each of the multiple pause messages 526A, 526B may require a predetermined pause time which is less than most pause times which will be asserted by the station 102. The station 102 may send a number of pause messages 526A, 526B to the source equal to the pause time, determined as described above with reference to FIG. 5A, divided by the predetermined pause time represented by each pause message 526A, 526B. The station 102 may send the multiple pause messages 5526A, 526B at intervals equal to the predetermined pause time represented by each pause message 526A, 526B, according to an example embodiment. When the source 112 stops receiving pause messages 526A, 526B, the source 112 may send the new packet C to the station 102, as described above with reference to FIG. 5A.

Figure 5C:
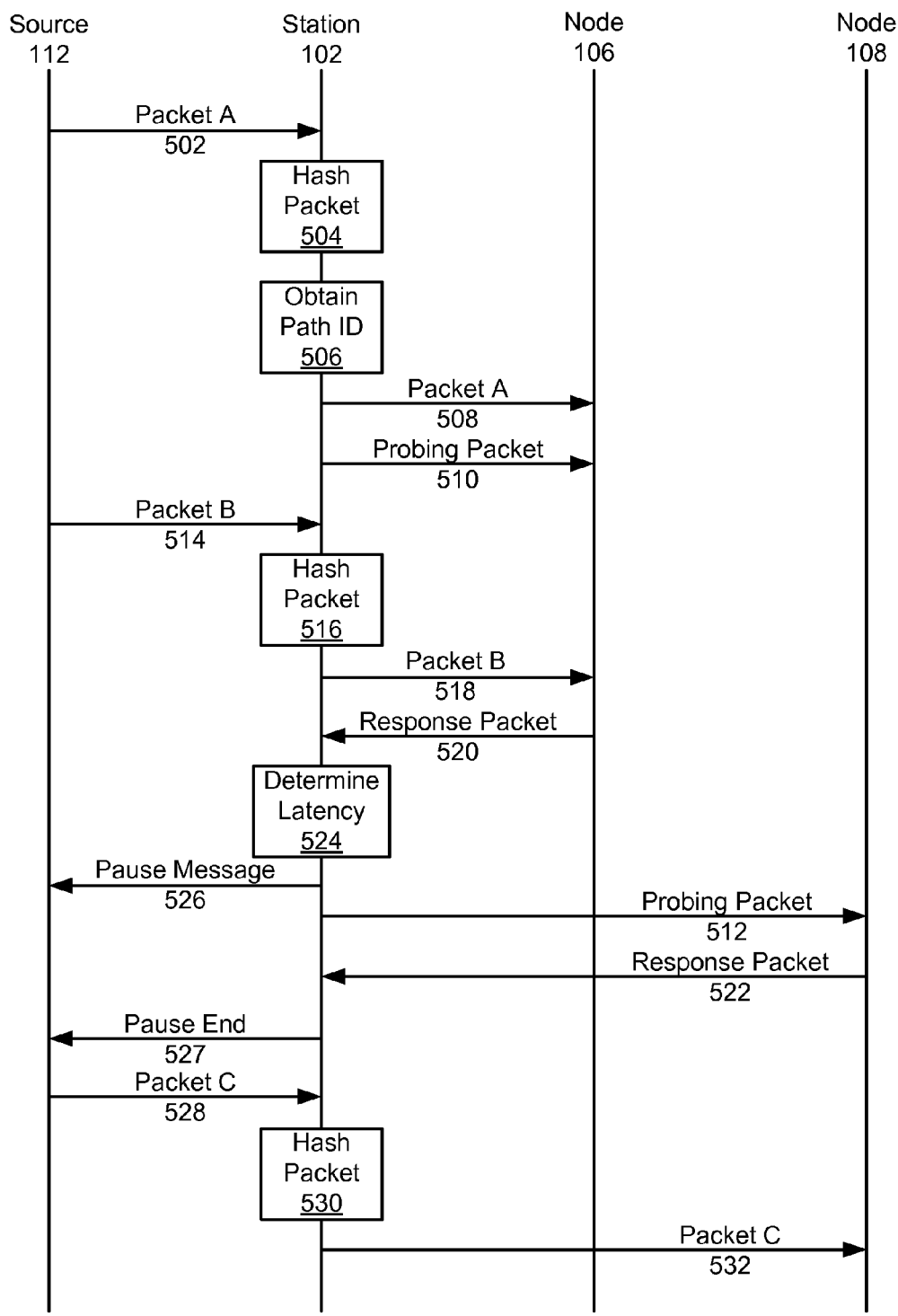
FIG. 5C is a timing diagram showing the station send packets in the flow set via the first path and then reroute the flow set and send a packet via the second path according to another example embodiment.

FIG. 5C is a timing diagram showing the station 102 send packets A 508, B 518 in the flow set via the first path and then reroute the flow set and send the packet C 532 via the second path according to another example embodiment. In this example, the station 102 may send probing packets 510 only for the active paths to determine whether the active path is congested until determining to reroute a flow set; after determining to reroute a flow set, the station 102 may send one or more probing packets 512 to a candidate path(s) to determine whether to reroute the flow set to the candidate path.

Thus, in the example shown in FIG. 5C, the station 102 may send a probing packet 510 to node 106, which is along the path that the station 102 will send the packets A 508, B, 518 in the flow set, but not to the node 108, because node 108 is not along the path that the station 102 will send the packets in the flow set (unless another flow set is being sent along a path which includes the node 108).

After determining that the path via which the packets A 508, B, 518 are sent is congested, the station 102 may send a pause message 526 to the source 112. In this example, the pause message 526 may instruct the source to stop sending packets until receiving a pause end message. The pause message 526 may instruct the source 112 to stop sending any packet to the station 102, to stop sending packets which have a specified destination address to the station 102, or to stop sending packets which are bound to a given flow set, according to various example embodiments.

While the source 112 is paused, the station 102 may send a probing packet 512 or scout packet through a candidate path (s), which may include node 108, for example, to the receiver 104. The receiver 104 may send a response packet 522 to the station 102 via the node 108, as described above with reference to FIG. 5A. The station 102 may update the path table 400 based on the time stamp(s) included in the response packet 522. If the station determines that the latency of the candidate path is sufficiently low or is lower than a latency threshold, and/or that the candidate path is not congested, then the station 102 may update the flow table 300 to insert the candidate path's identifier into the path ID field 308 for the respective flow set 302. The station 102 may also send a pause end message 527 to the source 112. In response to receiving the pause end message 527, the source 112 may re-start sending packets, such as the packet C 528, to the station 102. The station 102 may process and forward the packets, such as the packet C 528, to the receiver via the new or candidate path, such as via node 108, as described above with reference to FIG. 5A.

Figure 6:
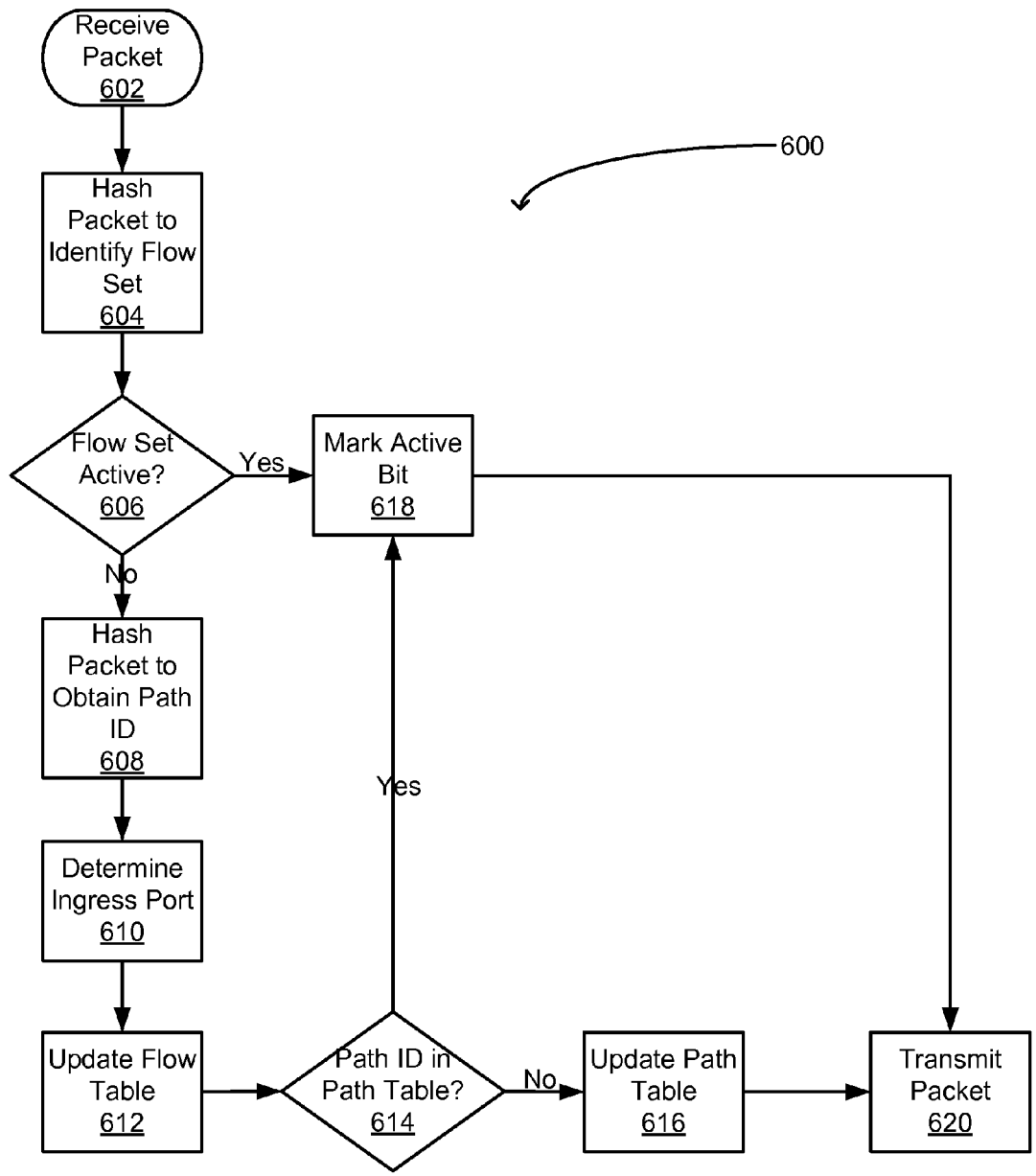
FIG. 6 is a flowchart showing an algorithm for receiving and transmitting a packet according to an example embodiment.

FIG. 6 is a flowchart showing an algorithm 600 for receiving and transmitting a packet according to an example embodiment. In this example, the station 102 may receive a packet from the source 112 (602). The station 102 may hash the packet to obtain a flow set (604). The station 102 may, for example, hash the source address 202 and the destination address 204 included in the packet to determine the flow set.

The station 102 may determine whether the flow set is active (606). The station 102 may, for example, check the active entry 304 in the flow table 300 for the flow set 302. If the flow set is active, then the station 102 may determine the path for the flow set by checking the path ID entry 308 in the flow table 300. The station 102 may mark an active field 304 in for the flow set 302 in the flow table 300 as active and mark an active field 404 for the path ID 402 in the path table as active (618), and transmit the packet (620). The active fields 304, 404 may be cleared based on a refresh timer, so marking the active fields 304, 404 may indicate that the flow set 302 and/or path ID 402 is still in use. The station 102 may transmit the packet (620) to the path indicated by the path ID entry 308 for the flow set 302 in the flow table 300.

If the flow set is not active, then the station 102 may use attributes of the packet to obtain a path ID, such as by hashing the packet to obtain a path ID (608), and/or performing a modulo operation on the hash value or the flow set number to obtain the path ID. The station 102 may, for example, hash values included in fields of the packet to obtain a table index, and may perform a modulo or bit map operation on the hash value to obtain the path ID. The station 102 may also determine an ingress port of the packet (610). The station 102 may update the flow table 300 (612), such as by marking the active entry 304 as active, filling in the ingress port entry 306 with the ingress port, and/or filling in the path ID entry 308 with the path of the flow set.

The station 102 may determine whether the path ID determined for the flow set is included in the path table 400 (614). If the path table 400 does not include the determined path ID, then the station 102 may update the path table 400 to include the path ID (616), and transmit the packet. If the path table 400 does include the path ID, then the station 102 may mark the active field 304 for the flow set 302 in the flow table 300 as active and mark the active field 404 for the path ID 402 in the path table as active (618), and transmit the packet (620).

Figure 7:
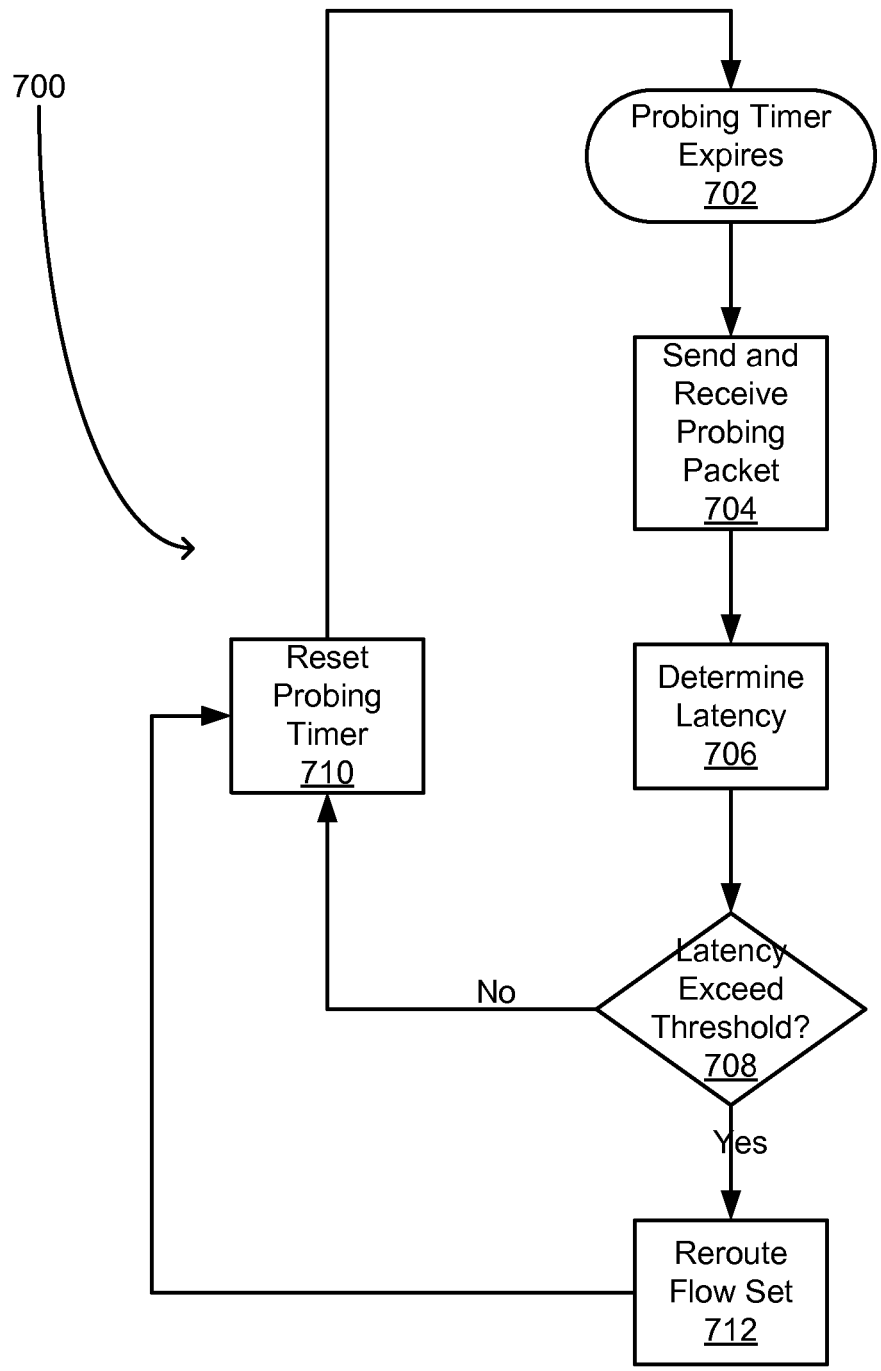
FIG. 7 is a flowchart showing an algorithm for determining whether to reroute a flow set according to an example embodiment.

FIG. 7 is a flowchart showing an algorithm 700 for determining whether to reroute a flow set according to an example embodiment. In this example, the station 102 may maintain a probing timer. Upon expiration of the probing timer (702), the station 102 may send and receive a probing and response packet(s) 510, 512, 520, 522 (704). The station 102 may determine a latency of a given path (706), such as based on a timestamp(s) included in the probing/response packet(s) 510, 512, 520, 522. The latency of the path may include an instantaneous latency based on a most recent probe/response packet 510, 512, 520, 522, and/or an average latency based on k most recent probe/response packets 510, 512, 520, 522 for the given path.

The station 102 may compare the latency of the path to a latency threshold (708). If both the instantaneous latency and the average latency are less than the latency threshold, then the path may be considered not congested. If the instantaneous latency is greater than the latency threshold but the average latency is less than the latency threshold, then the path may be considered to be experiencing transient congestion. If the instantaneous latency is less than the latency threshold but the average latency is greater than the latency threshold, then the path may be considered to be experiencing bursty congestion. If both the instantaneous latency and the average latency are greater than the latency threshold, then the path may be considered to be experiencing persistent or severe congestion. In example embodiments, the station may reroute the flow set (712) if the path used by the flow set for assignment is experiencing transient congestion, if the path for the flow set is experiencing bursty congestion, if the path for the flow set is experiencing severe congestion, if the path for the flow set is experiencing transient congestion or bursty congestion, if the path for the flow set is experiencing transient congestion or severe congestion, if the path for the flow set is experiencing bursty congestion or severe congestion, or if the path for the flow set is experiencing transient congestion, bursty congestion, or severe congestion.

If the station 102 determines that the path for the flow set is not experiencing one of the types of congestion for which the station 102 will reroute the flow set (such as by providing the flow set with a new path assignment), then the station 102 may reset the probing timer (710). If the station 102 determines that the path for the flow set is experiencing one of the types of congestion for which the station 102 will reroute the flow set, then the station 102 may reroute the flow set (712). In an example embodiment, the station 102 may reroute the flow set to a new path only if the move counter entry 310 for the flow set is below a predetermined threshold, to prevent thrashing of the flow set.

If the station 102 has been sending and receiving probing and response packets 510, 512, 520, 522 through multiple paths other than the current path, then the station may reroute packets bound to the flow set to a path which leads to the same destination but which has a lower latency, and send one or more pause messages 526, 526A, 526B to the source 112 to prevent reordering of packets, as described above with reference to FIGS. 5A and 5B. If the station 102 has not been sending and receiving probing and response packets 510, 512, 520, 522 through multiple paths other than the current path, then the station 102 may send a pause message to the source 112, send and receive probing and response packets 512, 522 to one or more candidate paths until finding a candidate path with a sufficiently low latency and or which is not congested, reroute the flow set, and release the ingress pause, such as by sending a pause end message 527 to the source 112, as described above with reference to FIG. 5C. After rerouting the flow set (712), the station 102 may reset the probing timer (710), according to an example embodiment.

Figure 8:
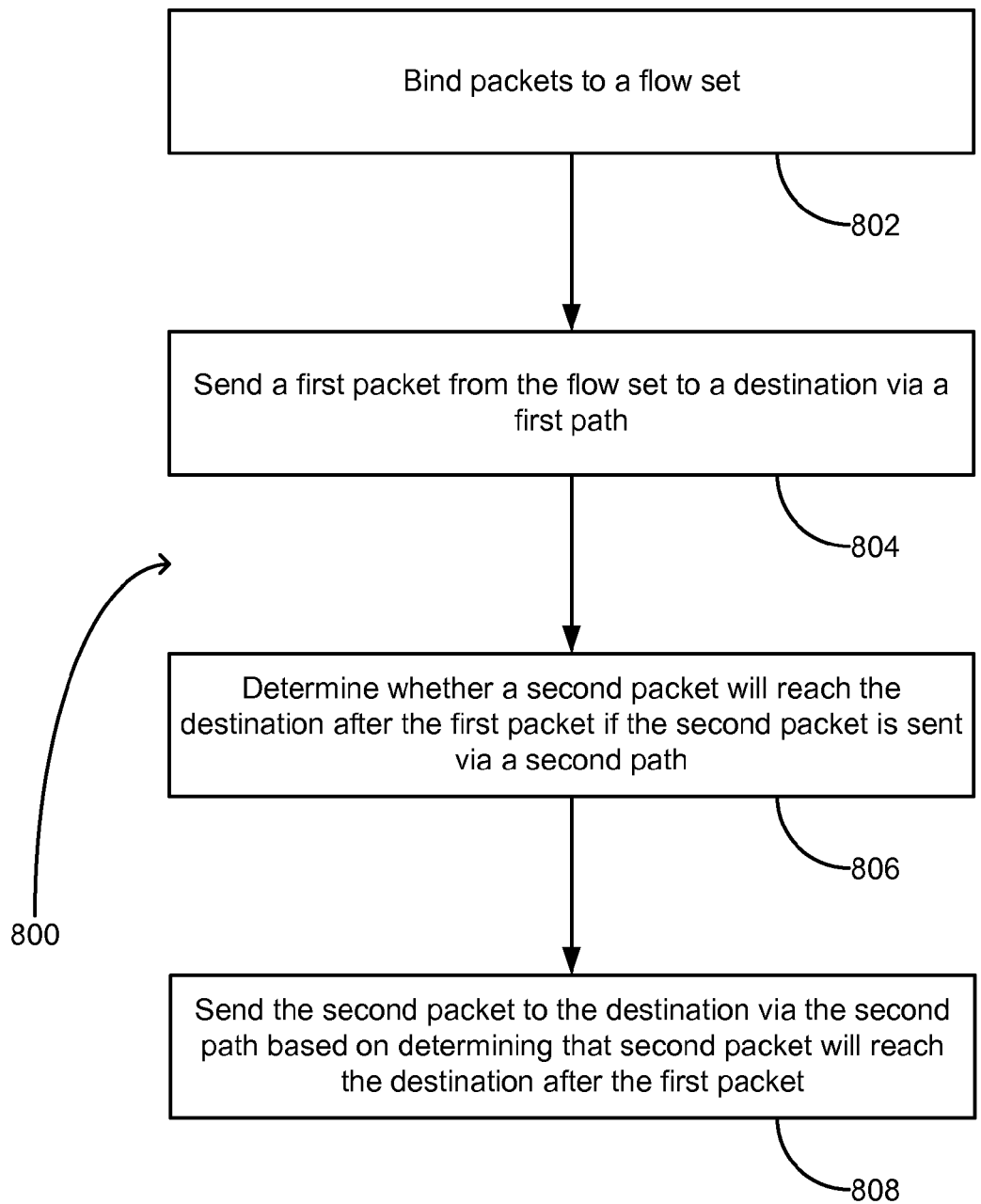
FIG. 8 is a flowchart showing a method according to an example embodiment.

FIG. 8 is a flowchart showing a method 800 according to an example embodiment. In this example, the station 102 may assign packets to a flow set (802). The station 102 may, for example, assign packets to either a first flow set or a second flow set based on fields included in the packets. The station 102 may, for example, hash fields included in the packets.

The station 102 may also send a first packet from the first flow set to a destination, such as to a receiver 104, via a first path (804). The station 102 may send the first packet via the first path through one or more ports. The station 102 may also determine whether a second packet will reach the destination after the first packet if the second packet is sent via a second path (806). The station 102 may have received the second packet after receiving the first packet. The station 102 may, for example, make the determination based at least in part on latencies of the first path and the second path.

The station 102 may send the second packet to the destination, such as to the receiver 102, via the second path (808). The station 102 may, for example, send the second packet via the second path based on the determination that the second packet will reach the destination after the first packet. The station 102 may send the second packet via the second packet through one or more ports.

In an example embodiment, the station 102 may determine latencies of the first path and/or the second path by sending probing packets into a network 100 and receiving probing response packets from the network 100.

In an example embodiment, the station 102 may determine whether sending the second packet from the first flow set to the first flow set destination via the second path will result in the second packet reaching the first flow set destination after the first packet reaches the first flow set destination based at least in part on the latencies of the first path and the second path and a time interval between sending the first packet and the second packet.

In an example embodiment, the station 102 may send the second packet to the first flow set destination via the second path based at least in part on determining that sending the second packet from the first flow set to the first flow set destination via a second path will result in the second packet reaching the first flow set destination after the first packet reaches the first flow set destination, and that the second path has a shorter latency than the first path.

In an example embodiment, the station 102 may send the second packet to the first flow set destination via the second path based at least in part on determining that the latency of the first path exceeds a latency threshold, that the latency of the second path does not exceed the latency threshold, and that sending the second packet from the first flow set to the first flow set destination via a second path will result in the second packet reaching the first flow set destination after the first packet reaches the first flow set destination.

In an example embodiment, the station 102 may send the second packet to the first flow set destination via the second path based at least in part on determining that sending the second packet from the first flow set to the first flow set destination via a second path will result in the second packet reaching the first flow set destination after the first packet reaches the first flow set destination, and that an instantaneous latency of the second path does not exceed a latency threshold, the instantaneous latency being based on a most recent probing packet sent via the probing path.

In an example embodiment, the station 102 may send the second packet to the first flow set destination via the second path based at least in part on determining that sending the second packet from the first flow set to the first flow set destination via a second path will result in the second packet reaching the first flow set destination after the first packet reaches the first flow set destination, and that an average latency of the second path does not exceed a latency threshold, the average latency being based on a plurality of probing packets sent via the second path.

In an example embodiment, the station 102 may send the second packet to the first flow set destination via the second path based at least in part on determining that sending the second packet from the first flow set to the first flow set destination via a second path will result in the second packet reaching the first flow set destination after the first packet reaches the first flow set destination, and that a number of path changes of the first flow set does not exceed a move count limit.

In an example embodiment, the station 102 may send the second packet to the first flow set destination via the second path based at least in part on determining that sending the second packet from the first flow set to the first flow set destination via a second path will result in the second packet reaching the first flow set destination after the first packet reaches the first flow set destination, that an instantaneous latency of the second path does not exceed a latency threshold, the instantaneous latency being based on a most recent probing packet sent via the probing path, that an average latency of the second path does not exceed a latency threshold, the average latency being based on a plurality of probing packets sent via the second path, and that a number of path changes of the first flow set does not exceed a move count limit.

In an example embodiment, the station 102 may send a pause message to a network device from which the packets from the first flow are received based at least in part on the latency of the first path exceeding a threshold.

In an example embodiment, the station 102 may send a pause message to a network device from which the packets from the first flow are received before sending the second packet to the first flow set destination via the second path.

In an example embodiment, the station 102 may send a pause message to a network device from which the packets from the first flow are received based at least in part on the latency of the first path exceeding a threshold, the pause message including a pause time based on least in part on a difference between the latency of the first path and the threshold.

In an example embodiment, the station 102 may send a pause begin message to a network device from which the packets from the first flow are received based at least in part on the latency of the first path exceeding a threshold, and send a pause end message to a network device from which the packets from the first flow are received based at least in part on the latency of the first falling below the threshold.

Figure 9:
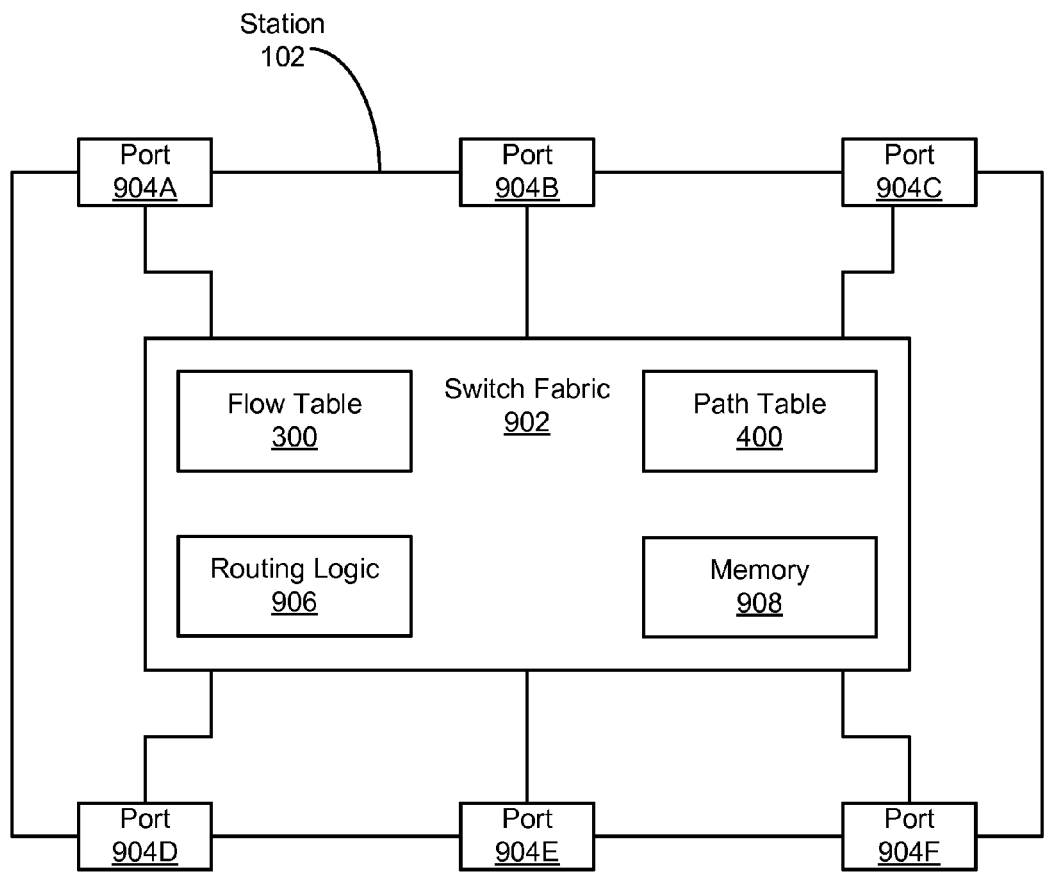
FIG. 9 is a block diagram showing the station according to an example embodiment.

FIG. 9 is a block diagram showing the station 102 according to an example embodiment. In this example, the station 102 may include a switch fabric 902. The switch fabric 902 may make any or all of the determinations, updates, modifications, and/or insertions described above with respect to the station 102. The station 102 may also include a plurality of ports 904A, 904B, 904C, 904D, 904E, 904F. The ports 904A, 904B, 904C, 904D, 904E, 904F may send and receive packets on behalf of the station 102.

The switch fabric 902 may include a routing logic 906. The routing logic 906 may include a processor which can perform any of the determinations and/or perform any of the functions described above with respect to the station 102. The switch fabric 902 may also include a memory 908. The memory 908 may store data and/or instructions on behalf of the routing logic 906. The switch fabric 902 may also include a flow table 300 and/or path table 400, described above with respect to FIGS. 3 and 4, respectively.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:
   a switch fabric configured to:
   send a first packet to a destination via a first path;
   determine, based at least in part on delays of the first path and a second path, whether sending a second packet to the destination via the second path will result in the second packet reaching the destination after the first packet reaches the destination, the second packet having been received by the switch fabric after the first packet;
   send a pause message to a network device from which the first and second packets are received based at least in part on the delay of the first path exceeding a threshold, the pause message including a pause time equal to a difference between the delay of the first path and the threshold;
   send the second packet to the destination via the second path based at least in part on the determining that sending the second packet to the destination via the second path will result in the second packet reaching the destination after the first packet reaches the destination, and determining that an instantaneous latency of the second path does not exceed the threshold, the instantaneous latency being based on a most recent probing packet sent via the second path, and determining that an average latency of the second path does not exceed the threshold, the average latency being based on a plurality of probing packets sent via the second path; and
   send a pause end message to the network device based at least in part on the delay of the first path falling below the threshold.

2. The apparatus of claim 1, wherein the switch fabric is configured to assign the packets to either a first flow set or a second flow set by performing a hashing operation using selected fields included in the packets to identify the flow set.

3. The apparatus of claim 1, further comprising:
   a plurality of ports configured to receive and forward packets to and from the switch fabric, wherein the switch fabric is configured to:
receive the packets from the plurality of ports;
send the first packet to the destination via the first path via at least one of the plurality of ports; and
send the second packet to the destination via the second path via at least one of the plurality of ports.

4. The apparatus of claim 1, wherein the switching fabric is configured to receive the packets from a plurality of ports.

5. The apparatus of claim 1, wherein the switching fabric is configured to determine the delays of each of the first path and the second path by sending probing packets to the destination and receiving probing response packets from the destination.

6. The apparatus of claim 1, wherein the switch fabric is configured to determine whether sending the second packet to the destination via the second path will result in the second packet reaching the destination after the first packet reaches the destination based at least in part on the delays of the first path and the second path and a time interval between sending the first packet and the second packet.

7. The apparatus of claim 1, wherein the switching fabric is configured to send the second packet to the destination via the second path based at least in part on determining:
that sending the second packet to the destination via the second path will result in the second packet reaching the destination after the first packet reaches the destination; and
that the second path has a shorter delay than the first path.

8. The apparatus of claim 1, wherein the switching fabric is configured to send the second packet to the destination via the second path based at least in part on determining:
that the delay of the first path exceeds a delay threshold;
that the delay of the second path does not exceed the delay threshold; and
that sending the second packet to the destination via the second path will result in the second packet reaching the destination after the first packet reaches the destination.

9. The apparatus of claim 1, wherein the switching fabric is configured to send the second packet to the destination via the second path based at least in part on determining:
that sending the second packet to the destination via the second path will result in the second packet reaching the destination after the first packet reaches the destination; and
that an instantaneous delay of the second path does not exceed a delay threshold, the instantaneous delay being based on a most recent probing packet sent via a probing path.

10. The apparatus of claim 1, wherein the switching fabric is configured to send the second packet to the destination via the second path based at least in part on determining:
that sending the second packet to the destination via the second path will result in the second packet reaching the destination after the first packet reaches the destination; and
that an average delay of the second path does not exceed a delay threshold, the average delay being based on a plurality of probing packets sent via the second path.

11. The apparatus of claim 1, wherein the switching fabric is configured to send the second packet to the destination via the second path based at least in part on determining:
that sending the second packet to the destination via the second path will result in the second packet reaching the destination after the first packet reaches the destination; and
that a number of path changes does not exceed a move count limit.

12. The apparatus of claim 1, wherein the switching fabric is configured to send the second packet to the destination via the second path based at least in part on determining:
that sending the second packet to the destination via the second path will result in the second packet reaching the destination after the first packet reaches the destination; and
that a number of path changes does not exceed a move count limit.

13. The apparatus of claim 1, wherein the switching fabric is configured to send the pause message to the network device before sending the second packet to the destination via the second path.

14. The apparatus of claim 1, wherein the switch fabric is further configured to assign packets to either a first flow set or a second flow set based on fields included in the packets.

15. An apparatus comprising:
a switch fabric configured to:
determine whether a flow set is valid for assignment from an old path to a new path based on a time since sending a last packet to a destination via the old path, a difference between a latency of the old path and a latency of the new path, and the time since sending the last packet to the destination exceeding the latency of the new path;
send a pause message to a network device from which the last packet is received based at least in part on the latency of the old path exceeding a threshold, the pause message including a pause time equal to a difference between the latency of the old path and the threshold;
reroute the flow set from the old path to the new path based on the time since sending the last packet to the destination via the old path, the difference between the latency of the old path and the latency of the new path, and the time since sending the last packet to the destination exceeding the latency of the new path, and based on determining that an instantaneous latency of the new path does not exceed the threshold, the instantaneous latency being based on a most recent probing packet sent via the new path, and determining that an average latency of the new path does not exceed the threshold, the average latency being based on a plurality of probing packets sent via the new path; and
send a pause end message to the network device based at least in part on the latency of the old path falling below the threshold.

16. The apparatus of claim 15, further comprising:
determining the latency of the old path by sending a first probing packet to the destination via the old path; and
determining the latency of the new path by sending a second probing packet to the destination via the new path.

17. A switch fabric comprising:
a memory storing:
a flow table including, for each of a plurality of flow sets:
a flow set active entry indicating whether the flow set is valid for assignment from a current path to a new path;
a path ID entry indicating the current path, from a plurality of paths, for the flow set; and
a path table including, for each of the plurality of paths:
a path ID active entry indicating whether any of the flow set active entries indicate that a flow set associated with the path ID in the flow table are available for assignment to the new path;
an instantaneous latency entry indicating an instantaneous latency based on a measured latency of a most recent probing packet;

an average latency entry indicating an average latency based on latency measurements of a plurality of recent probing packets; and a path state entry indicating a degree of path congestion for the path based on the instantaneous latency and the average latency of the path; and a processor configured to:

determine the instantaneous latency and the average latency for each of the plurality of paths by sending probing packets to a destination via each of the plurality of paths;

determine the degree of path congestion for each of the paths based on the instantaneous latency and the average latency of the path;

generate a pause message based at least in part on the latency of the current path exceeding a latency threshold, the pause message including a pause time equal to a difference between the latency of the current path and the latency threshold;

determine that the path is experiencing transient congestion if the instantaneous latency exceeds the latency threshold but the average latency does not exceed the latency threshold;

determine that the path is experiencing bursty congestion if the instantaneous latency does not exceed the latency threshold but the average latency does exceed the latency threshold;

change the path ID entry for a flow set from the current path to a new path based on the path state of the current path and the path state of the new path; and generate a pause end message based at least in part on the latency of the current path falling below the latency threshold.

18. The switch fabric of claim 17, wherein:

the memory further stores a move counter entry indicating a number of times that the flow set has received a new path assignment; and the processor is configured to change the path ID entry for the flow set from the current path to the new path based on the degree of path congestion of the current path and the degree of path congestion of the new path and based on the number of times indicated by the move counter for the flow set being below the latency threshold.

19. The switch fabric of claim 17, wherein the processor is configured to determine:

that the path is not experiencing congestion if neither the instantaneous latency nor the average latency exceed the latency threshold;

and that the path is experiencing persistent congestion if both the instantaneous latency and the average latency exceed the latency threshold.

* * * * *